(12) United States Patent
Gu

(10) Patent No.: US 9,581,023 B2
(45) Date of Patent: Feb. 28, 2017

(54) OPENCAST COAL MINE UNDERGROUND WATER RESERVOIR

(71) Applicant: CHINA SHENHUA ENERGY COMPANY LIMITED, Beijing (CN)

(72) Inventor: Dazhao Gu, Beijing (CN)

(73) Assignee: CHINA SHENHUA ENERGY COMPANY LIMITED, Beijing (CN)

( * ) Notice: Subject to any disclaimer, the term of this patent is extended or adjusted under 35 U.S.C. 154(b) by 149 days.

(21) Appl. No.: 14/441,715

(22) PCT Filed: Apr. 27, 2013

(86) PCT No.: PCT/CN2013/074877
§ 371 (c)(1),
(2) Date: Aug. 10, 2015

(87) PCT Pub. No.: WO2014/079199
PCT Pub. Date: May 30, 2014

(65) Prior Publication Data
US 2015/0337660 A1 Nov. 26, 2015

(30) Foreign Application Priority Data
Nov. 20, 2012 (CN) .................... 2012 2 0617405 U

(51) Int. Cl.
*E21F 17/16* (2006.01)
*C02F 1/44* (2006.01)
(Continued)

(52) U.S. Cl.
CPC .............. *E21F 17/16* (2013.01); *B65G 5/005* (2013.01); *C02F 1/44* (2013.01); *E04H 7/02* (2013.01);
(Continued)

(58) Field of Classification Search
CPC .. E21F 17/16; E04H 7/02; C02F 1/001; C02F 2103/10; B65G 5/00; B65G 5/005
(Continued)

(56) References Cited

U.S. PATENT DOCUMENTS 5,575,922 A * 11/1996 Green ....................... C02F 1/66
210/747.1
2010/0272514 A1* 10/2010 Hart .......................... E01F 5/00
405/55

FOREIGN PATENT DOCUMENTS

CN 102121267 A 7/2011
CN 102336484 A 2/2012
(Continued)

*Primary Examiner* — Christopher Upton
(74) *Attorney, Agent, or Firm* — Armstrong Teasdale LLP

(57) ABSTRACT

An opencast coal mine underground water reservoir comprising an impermeable layer and, provided below the impermeable layer, a water storage space and a purification layer. The water storage space comprises a first water storage space and a second water storage space. The purification layer comprises a first purification layer and a second purification layer. The first purification layer is provided horizontally in the water storage space and divides the water storage space into the first water storage space and the second water storage space. The first water storage space is provided below the impermeable layer and between same and the first purification layer. The second water storage space is provided below the first water storage space and the bottom of the second water storage space is provided at the bottom of the opencast coal mine underground water reservoir. The second purification layer is provided vertically within the second water storage space. The present invention, by constructing the opencast coal mine underground water reservoir, prevents wastage of water resource produced during a coal mining process, and by providing the purification layer in the opencast coal mining underground (Continued)

water reservoir, implements repeated purification of water, prevents environmental pollution, and implements a water conservation mining policy during the coal mining process.

9 Claims, 1 Drawing Sheet

(51) Int. Cl.
  *E04H 7/02* (2006.01)
  *B65G 5/00* (2006.01)
  *C02F 103/10* (2006.01)
  *C02F 103/06* (2006.01)
  *C02F 1/00* (2006.01)
(52) U.S. Cl.
  CPC .......... *C02F 1/001* (2013.01); *C02F 2103/06* (2013.01); *C02F 2103/10* (2013.01)
(58) Field of Classification Search
  USPC .......... 210/747.1, 747.9, 170.01; 405/53, 55
  See application file for complete search history.

(56) References Cited

FOREIGN PATENT DOCUMENTS

| | | | |
|---|---|---|---|
| CN | 102767302 A | 11/2012 |
| CN | 102778215 A | 11/2012 |
| CN | 102913282 A | 2/2013 |

\* cited by examiner

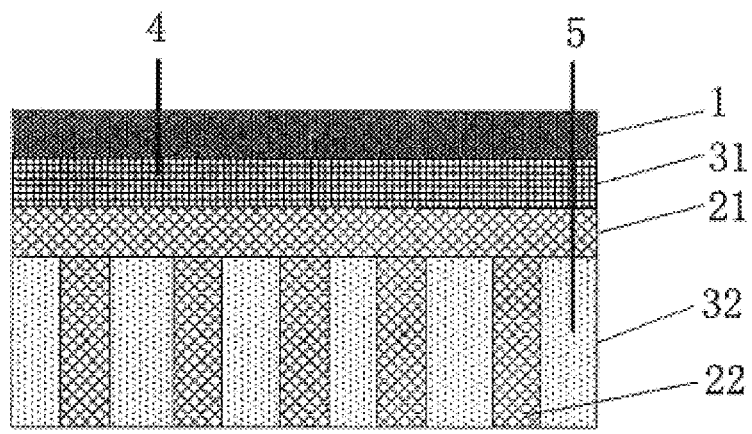

OPENCAST COAL MINE UNDERGROUND WATER RESERVOIR

TECHNICAL FIELD

The present invention relates to a reservoir, and specifically to an opencast coal mine underground water reservoir.

BACKGROUND OF THE INVENTION

During opencast coal mining, it is necessary to pump and discharge a great plenty of water to ensure a smooth production. Currently, coal mine water pumping and discharge are mainly carried out by water discharge, thus seriously wasting water resource. In addition, the underground water reservoir for storing opencast coal mine water as pumped and discharged is different from the traditional ones. It not only needs an underground space constructed for water storage, but also needs a function of filtering and purification, thus enabling filtering and purification of a polluted water source produced during coal mining.

However, a prior underground water reservoir can not meet a requirement for filtering and purification of the polluted water source, so a water source polluted during coal mining is directly discharged or stored without purification processing, thus seriously polluting the environment.

SUMMARY OF THE INVENTION

In view of the problem in the prior art, the objective of the present invention is to provide an opencast coal mine underground water reservoir which can store water resource produced during a coal mining process, and also can filter and purify water in the water reservoir repeatedly, thus preventing environmental pollution.

The technical objective of the present invention is implemented by the following technical solution.

An opencast coal mine underground water reservoir includes an impermeable layer and, provided below the impermeable layer, a water storage space and a purification layer, wherein the water storage space includes a first water storage space and a second water storage space, the first water storage space is horizontally provided below the impermeable layer, and the second water storage space is vertically provided at the bottom of the opencast coal mine underground water reservoir; and the purification layer includes a first purification layer and a second purification layer, the first purification layer is horizontally provided below the first water storage space, and the second purification layer is vertically provided within the second water storage space.

Further, the second water storage space is vertically provided with a plurality of the second purification layers.

Further, the second purification layer has a filtering thickness of 30-60 cm.

Further, the impermeable layer has a thickness above 50 cm.

Further, the impermeable layer has a permeability coefficient below $10^{-4}$ cm/s.

Further, the impermeable layer consists of one or more materials from soil, mudstone, siltstone and fine sandstone.

Further, the first purification layer has a filtering thickness of 50-100 cm.

Further, the first water storage space has a thickness of 1.5-2 m.

Further, the first water storage space is filled with a type of sand gravel and/or sandy conglomerate, of which a granularity(s) is (are) above 5 cm.

Further, the second water storage space is filled with a type of sand gravel and/or sandy conglomerate, of which a granularity(s) is (are) above 3-5 cm.

The present invention, by constructing the opencast coal mine underground water reservoir, prevents wastage of water resource produced during a coal mining process, and by providing the purification layer in the opencast coal mining underground water reservoir, realizes repeated purification of water, prevents environmental pollution, and implements a water conservation mining policy during the coal mining process.

DESCRIPTION OF THE DRAWINGS

FIG. 1 is a diagram of a preferred opencast coal mine underground water reservoir of the present invention.

DESCRIPTION OF EXEMPLARY EMBODIMENTS

Hereinafter, the present invention will be explained in detail by a preferred embodiment with reference to the figures.

As shown in FIG. 1, the present invention provides an opencast coal mine underground water reservoir including an impermeable layer 1 and, provided below the impermeable layer 1, a water storage space and a purification layer. The water storage space includes a first water storage space 31 and a second water storage space 32.

The purification layer includes a first purification layer 21 and a second purification layer 22. The first purification layer 21 is horizontally provided in the water storage space and divides the water storage space into the first water storage space 31 and the second water storage space 32, the first water storage space 31 is provided below the impermeable layer 1 and between the impermeable layer 1 and the first purification layer 21, the second water storage space 32 is provided below the first water storage space 31 and bottom of the second water storage space 32 is positioned at bottom of the opencast coal mine underground water reservoir, and the second purification layer 22 is vertically provided within the second water storage space 32.

Preferably, the impermeable layer 1 has a thickness above 50 cm and a permeability coefficient below $10^{-4}$ cm/s. In consideration of cost saving, preferably, the impermeable layer 1 consists of one or more materials from soil, mudstone, siltstone and fine sandstone. The soil, mudstone, siltstone and fine sandstone are materials peeled off during mining of an opencast coal mine, and thus construction cost for the underground water reservoir can be saved effectively. Certainly, the soil, mudstone, siltstone and fine sandstone are just preferred materials for the impermeable layer in the present embodiment. In the present invention, other materials known by those skilled in the art, which have a sufficient hydrophobicity, can be used, and they will not be further described herein.

As shown in FIG. 1, in the present embodiment, the water storage space includes a first water storage space 31 and a second water storage space 32, wherein the first water storage space 31 is provided below the impermeable layer 1, and the second water storage space 32 can be provided at the bottom of the opencast coal mine underground water reservoir. Preferably, the first water storage space 31 and the second water storage space 32 are filled therein with filling materials used to form the underground storage space for an aquifer or an aqueous stratum.

In the present embodiment, the purification layer includes a first purification layer 21 and a second purification layer 22, the first purification layer 21 is horizontally provided below the first water storage space 31, and the second purification layer 22 is vertically provided within the second water storage space 32. As a preferred embodiment of the present invention, the second water storage space 32 is vertically provided therein with a plurality of the second purification layers 22, thus enabling repeated filtering and purification for water in the water reservoir.

It can be known by measurement that the water in the opencast coal mine underground water reservoir of the present invention, by multiple times of purification, can meet the standard for mine discharge water: in the water, a PH value is decreased from 7.5 to 6.4, chemical oxygen demand (COD) content is decreased from 122 ppm to 30 ppm, and/or content of ammonia and nitrogen is decreased from 3.68 mg/L to 0.47 mg/L. The discharged water produced during opencast coal mining, by purification and storage of the opencast coal mine underground water reservoir of the present invention, meets the standard for discharge, and its parameters such as the content of ammonia and nitrogen can even meet the standard for drink water. Thus, it can be seen that the opencast coal mine underground water reservoir provided with the first purification layer and the second purification layer can effectively increase purification efficiency and improve water quality.

In consideration of saving construction cost for the water reservoir, in the present invention, a filling material for the first water storage space 31 and the second water storage space 32 mainly come from a type of sand gravel in a loose rock group of a quaternary system and/or sandy conglomerate of a clastic rock group, which is (are) peeled off in the opencast mine. A permeable coefficient(s) of the type of sand gravel and/or the sandy conglomerate is (are) $6.17\times10^{-4}$~$1.03\times10^{-3}$ m/d, and a specific yield(s) is (are) 6.4. The type of sand gravel has an average granularity of 1-5 cm. The sandy conglomerate has an average granularity of 0.5-3 cm and a maximum granularity of up to 6-8 cm. In order to ensure that the water injected back can have sufficient space for flowing and it has a relatively low impact on the first purification layer 21, preferably, the first water storage space 31 has a thickness of 1.5-2 m, and the first water storage space 31 is filled with a type of sand gravel and/or sandy conglomerate, of which the granularity(s) is(are) large, that is, the first water storage space 31 is filled with a type of sand gravel and/or sandy conglomerate, of which the granularity(s) is(are) above 5 cm. In the present invention, the second water storage space 32 is filled with a type of sand gravel and/or sandy conglomerate, of which the granularity(s) is(are) above 3-5 cm.

As a preferred embodiment of the present invention, preferably, the first purification layer 21 and the second purification layer 22 of the present invention can be formed by filling it with one or more materials from anthracite, quartz sand and activated carbon. In order to lower the cost and ensure the effect of filtering and purification, in the present embodiment, preferably, the first purification layer 21 has a filtering thickness of 50-100 cm which is a physical thickness in vertical direction of the first purification layer 21, and the second purification layer 22 has a filtering thickness of 30-60 cm which is a physical thickness in horizontal direction of the second purification layer 22.

In filtering, as shown in FIG. 1, the bottom of the injecting-back pipe 4 is provided in the first water storage space 31 and the bottom of the pumping pipe 5 is provided in the second water storage space 32. The water injected back flows from the top of the injecting-back pipe 4 into the first water storage space 31, then after purification by the first purification layer 21, enters into the second water storage space 32 in which the water is filtered repeatedly through the vertically provided second purification layers 22 and is thus purified, and finally discharged from the top of the pumping pipe 5. Certainly, the pumping pipe 5 may be directly connected with a pump by which the water that has been filtered and purified is pumped out.

With the opencast coal mine underground water reservoir of the present invention, the peeled-off material produced in the opencast coal mine is used as the impermeable layer at the top of the water reservoir to prevent the reservoir water from being polluted by seepage water from other water source Also, by a design of the purification layer of the present invention, the water can be purified repeatedly, thus protecting water resource and implementing a water conservation mining policy during the coal mining process.

The above embodiments are used only to explain the present invention, but not for limiting the present invention. Those skilled in the art can further make various changes and modifications without departing from the spirit and scope of the present invention. Therefore, all the equivalent technical solutions will fall into the scope of the present invention and the patent protection scope of the present invention will be defined by the claims.

The invention claimed is:

1. An underground water reservoir of opencast coal mine, characterized in that it comprises an impermeable layer and, provided below the impermeable layer, a water storage space and a purification layer, wherein the water storage space comprises a first water storage space and a second water storage space;

the purification layer comprises a first purification layer and a second purification layer, the first purification layer is horizontally provided in the water storage space and divides the water storage space into the first water storage space and the second water storage space, the first water storage space is provided below the impermeable layer and between the impermeable layer and the first purification layer, the second water storage space is provided below the first water storage space and bottom part of the second water storage space is positioned at the bottom of the opencast coal mine underground water reservoir, and the second purification layer is vertically provided within the second water storage space, and the second water storage space is vertically provided with a plurality of the second purification layers, the first purification layer has a filtering thickness which is a physical thickness in vertical direction of the first purification layer, and the second purification layer has a filtering thickness which is a physical thickness in horizontal direction of the second purification layer.

2. The underground water reservoir of opencast coal mine of claim 1, wherein the filtering thickness of the second purification layer is 30-60cm.

3. The underground water reservoir of opencast coal mine of claim 1, wherein the impermeable layer has a thickness above 50cm.

4. The underground water reservoir of opencast coal mine of claim 1, wherein the impermeable layer has a permeability coefficient below $10^{-4}$cm/s.

5. The underground water reservoir of opencast coal mine of claim 1, wherein the impermeable layer consists of one or more materials from soil, mudstone, siltstone and fine sandstone.

6. The underground water reservoir of opencast coal mine of claim 1, wherein the filtering thickness of the first purification layer is 50-100cm.

7. The underground water reservoir of opencast coal mine of claim 1, wherein the first water storage space has a thickness of 1.5-2m.

8. The underground water reservoir of opencast coal mine of claim 1, wherein the first water storage space is filled with a type of sand gravel and/or sandy conglomerate, of which granularities are above 5cm.

9. The underground water reservoir of opencast coal mine of claim 1, wherein the second water storage space is filled with a type of sand gravel and/or sandy conglomerate, of which granularities are above 3-5cm.

* * * * *